(12) United States Patent
Altin (10) Patent No.: US 8,866,854 B2
(45) Date of Patent: Oct. 21, 2014

(54) CONSOLIDATED ORTHOGONAL GUIDE CREATION

(75) Inventor: Daniel John Altin, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 13/285,010

(22) Filed: Oct. 31, 2011

(65) Prior Publication Data

US 2013/0106917 A1     May 2, 2013

(51) Int. Cl.
*G06G 5/00*     (2006.01)
*G06F 3/0481*   (2013.01)

(52) U.S. Cl.
CPC ................... *G06F 3/04812* (2013.01)
USPC ........................................ 345/667

(58) Field of Classification Search
CPC .................................. G06F 3/04812
USPC .................................. 345/666, 667
See application file for complete search history.

(56) References Cited

U.S. PATENT DOCUMENTS

| | | | | |
|---|---|---|---|---|
| 5,299,307 A | * | 3/1994 | Young | 715/861 |
| 5,745,099 A | * | 4/1998 | Blomqvist | 715/862 |
| 5,774,111 A | * | 6/1998 | Lecland et al. | 715/856 |
| 5,798,761 A | * | 8/1998 | Isaacs | 345/419 |
| 7,545,392 B2 | | 6/2009 | Sprang et al. | |
| 2010/0020101 A1 | * | 1/2010 | Schormann | 345/654 |
| 2011/0050686 A1 | * | 3/2011 | Nojima et al. | 345/419 |

OTHER PUBLICATIONS

"Ruler Guides", Retrieved at <<http://help.adobe.com/en_US/InDesign/6.0/WSfd1234e1c4b69f30d2a5051004d659b1c-7fefa.html>>, Retrieved Date: Sep. 1, 2011, pp. 8.

Johnson, Steve., "Working with Guides, Grid & Slices", Retrieved at <<http://www.informit.com/articles/article.aspx?p=1312599&seqNum=8>>, Dec. 15, 2008, pp. 2.

"Preparation of Flow Cytometry Figures Using FlowJo and Canvas", Retrieved at << http://www.microbiology.emory.edu/altman/f_protocols/f_flowCytometry/flowFigures_p2.html>>, Retrieved Date : Sep. 1, 2011, pp. 11.

Lechat, Felionia., "How to Add Guides in PowerPoint", Retrieved at << http://www.ehow.com/how_7289659_add-guides-powerpoint.html>>, Oct. 5, 2010, pp. 4.

"Inkscape Interface", Retrieved at <<http://en.flossmanuals.net/inkscape/ch003_the-inkscape-interface>>, Retrieved Date : Sep. 1, 2011, pp. 6.

"Alignment Using Drawing Guides on a PowerPoint Slide", Retrieved at << http://www.aspirecommunications.com/newsletter-design-alignment-using-drawing-guides.html>>, Retrieved Date : Sep. 1, 2011, pp. 2.

* cited by examiner

*Primary Examiner* — Edward Martello
(74) *Attorney, Agent, or Firm* — Jim Ross; Micky Minhas (57) ABSTRACT

A guide is configured in an authoring program to aid the user in editing objects on a document. The guide can be a horizontally or vertically oriented guide line and can be created from a single ruler, either a vertical or horizontal ruler displayed on the workspace. To create a horizontal guide, the user can position the cursor on a horizontal ruler. The user can click-and-hold and drag the cursor to create and position a horizontal guide over the workspace. To create a vertical guide, the user can position the cursor in the horizontal ruler and click and release. The user can create both vertical and horizontal guides using the vertical ruler in a corresponding manner, where clicking on the vertical ruler creates a horizontal guide, and click-and-hold and dragging creates a vertical guide. Guides can be individually configured or altered in their visual characteristics.

20 Claims, 10 Drawing Sheets

CONSOLIDATED ORTHOGONAL GUIDE CREATION

BACKGROUND

Document authoring programs, particularly those which are graphics oriented, frequently provide guides on the workspace to help the user orient and position objects. The term "guides," as used herein, are typically horizontal or vertical lines that are displayed on the user interface over the workspace area (e.g., the portion of the user interface where the document is being created or edited), but the guides are not part of the document. The term "guide" and "guide line" are used interchangeably herein. A function of a guide is to facilitate alignment and positioning of objects by the user on the workspace. For example, a user generating a graphical image may position a number of graphical objects in a row or in a column. A guide can assist the user in positioning objects on the workspace and are typically only viewed in the editing mode. When the completed document is viewed in a presentation mode or printed, the guides are typically not shown.

Different users have different preferences as to using guides when editing a document. In some instances, the need for alignment of objects is minimal, and the user may desire to remove the guides (if present) or not add them. In other instances, guides maybe benefit the user. User may incorporate guides when editing certain objects, and then dispense with them when editing other objects. Thus, mechanisms to easily create and remove guides are required.

It is with respect to these and other considerations that the disclosure made herein is presented.

SUMMARY

Concepts and technologies are described herein for easily and intuitively generating a guide in a document authoring program. Either vertical or horizontal guides can be created in a similar manner by a user interacting, in one embodiment, with a single ruler.

In one embodiment disclosed herein, a method for generating a guide line includes the operations of detecting by a processor a cursor positioned over a ruler on a user interface of an authoring program executing on the processor and altering an appearance of the cursor by the processor from a first shape to a second shape. The operations further include receiving a first input from a user at the processor, the input associated with a user input device, receiving a second input from the user at the processor, where the second input is associated with the user input device. The operations further include generating the guide line in a first orientation if the first input from the user input device is a click, and generating the guide line in a second orientation orthogonal to the first orientation if the first input from the user input device is a click-and-hold while moving the cursor away from the ruler.

In another embodiment disclosed herein, a system for displaying a guide line includes a processor configured to detect a cursor positioned over a ruler displayed on a user interface of an authoring program and alter the appearance of the cursor from a first shape to a second shape in response to detecting the cursor positioned over the ruler. The processor is further configured to receive a first input from a user, the input associated with a user input device, and receive a second input from the user at the processor, the second input associated with the user input device. The processor is also configured to generate the guide line in a first orientation if the first input is a click, and generate the guide line in a second orientation orthogonal to the first orientation if the first input is a click-and-hold followed by input moving the cursor away from the ruler.

In another embodiment, a computer readable storage media includes instructions that when executed cause a computer to detect a cursor positioned over a ruler on a user interface of an authoring program, the authoring program configured to edit a document in a workspace of the authoring program, and alter the appearance of the cursor from a first shape to a second shape in response to detecting the cursor positioned over the ruler. The instructions further cause the computer to receive a first input from a user and receive a second input from the user at the processor. The instructions further cause the processor to generate the guide line in a first orientation orthogonal to the ruler if the first input is a click and generate the guide line in a second orientation parallel to the ruler if the first input is a click-and-hold that moves the cursor away from the ruler.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

In the following detailed description, references are made to the accompanying drawings that form a part hereof, and which are shown by way of illustration specific embodiments or examples. Referring now to the drawings, in which like numerals represent like elements throughout the several figures, aspects of configuring a drawing guide will be presented.

The following detailed description is directed to generating and configuring guides in an authoring program. An authoring program (a.k.a. authoring application), particular those focused on authoring documents with graphical objects and generally referred to herein as a drawing application, may provide various drawing aids on the user interface ("UI") to assist the user in placing or editing an object on the workspace. The concepts and application thereof are illustrated in the context of a drawing application, but the concepts disclosed herein may be applied to other types of authoring application, including those directed to manipulating images, photos, videos or other types of objects.

Figure 1:
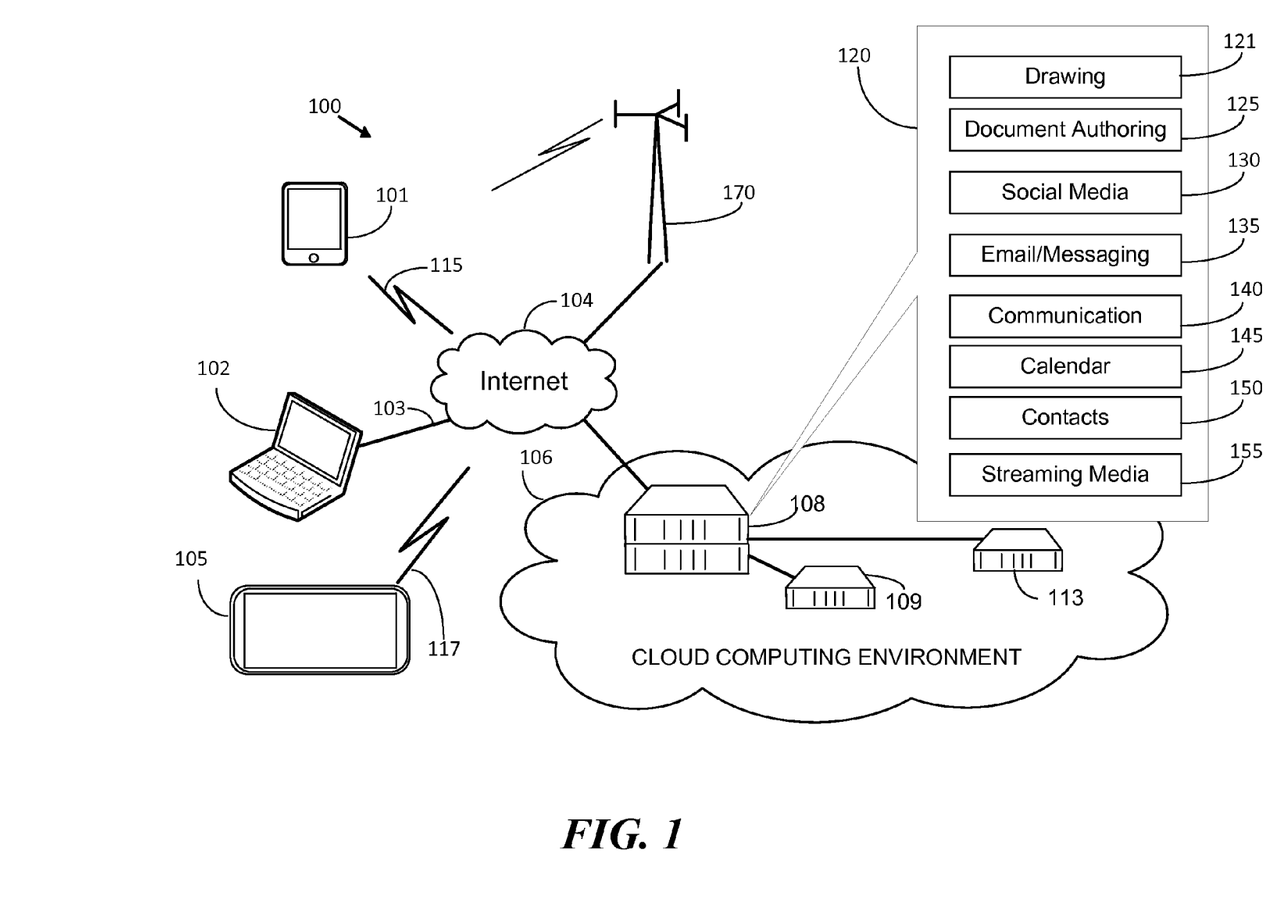
FIG. 1 is a schematic diagram showing one environment in which the user may configure guides in an authoring program according to one embodiment presented herein.

One context for using the concepts disclosed herein is shown in the system illustration 100 of FIG. 1. In FIG. 1, the user could be using various types of computing devices for locally executing the drawing application, including computing devices comprising a smart phone 101, a laptop computer 102, or a tablet computing device 105. Application of the concepts disclosed herein is not limited to these types of computing devices, as the concepts can be used by other types of computing devices, including a server 108.

The computing devices can utilize wireless connections 115, 117 to interact with a cloud-based computing environment 106. The wireless connections for the devices provide connectivity to the cloud computing environment 106 in one embodiment by the Internet 104 and can be based on various readily available technologies, including the various cellular based technologies (CDMA, GSM, 4G, EDGE, etc.) originating from cellular infrastructure 170 provided by a cellular service provider or other wireless technologies (e.g., WiMax, WiFi, etc.) The wired technologies 103 can be based on ISDN, cable modems, DSL, and other well known technologies.

The connectivity afforded by the wired 103 and wireless 115, 117 communications through the Internet 104 provides the computing devices with access to servers 108 in the cloud computing environment 106. The computing devices 101, 102 or 105 can download the drawing application from the server 108 as necessary for local execution, or can interact with a drawing application 121 executing on the server 108. Other configurations are possible. Although the concepts illustrated herein may refer to a single server 108, there may be various servers involved. For example, the server 108 may be accessed by a computing device 101, which may in turn, access another server 113. A plurality of servers may be used in another embodiment.

The server 108 may execute various applications 120. These may be executed in a shared or distributed manner across one or more servers with the computing device 101, 102, or 105. The applications 120 may include a drawing application 121 for creating and editing graphical oriented programs. Applications for editing images, video, etc. may also be considered with the scope of a drawing application. Other forms of authoring applications 125 may also create and edit documents, such as text documents and spread sheet documents.

Other applications executing on the server 108 may include social media applications 130 for managing social oriented messaging and communications. Another application may be an email/messaging application 135 and may allow for various individually oriented messaging capabilities, including instant messaging. A communications application 140 may allow for video chat or voice communication. A calendar application 145 may allow for organizing meetings and events. A contact application 150 may allow for organizing contact information for individuals. A streaming media application 155 may provide for streaming digital data, such as audio or video files. Each of these applications may store data, which the server 108 may maintain in a data store 109. Other types and configurations of storage systems may be used.

Figure 2:
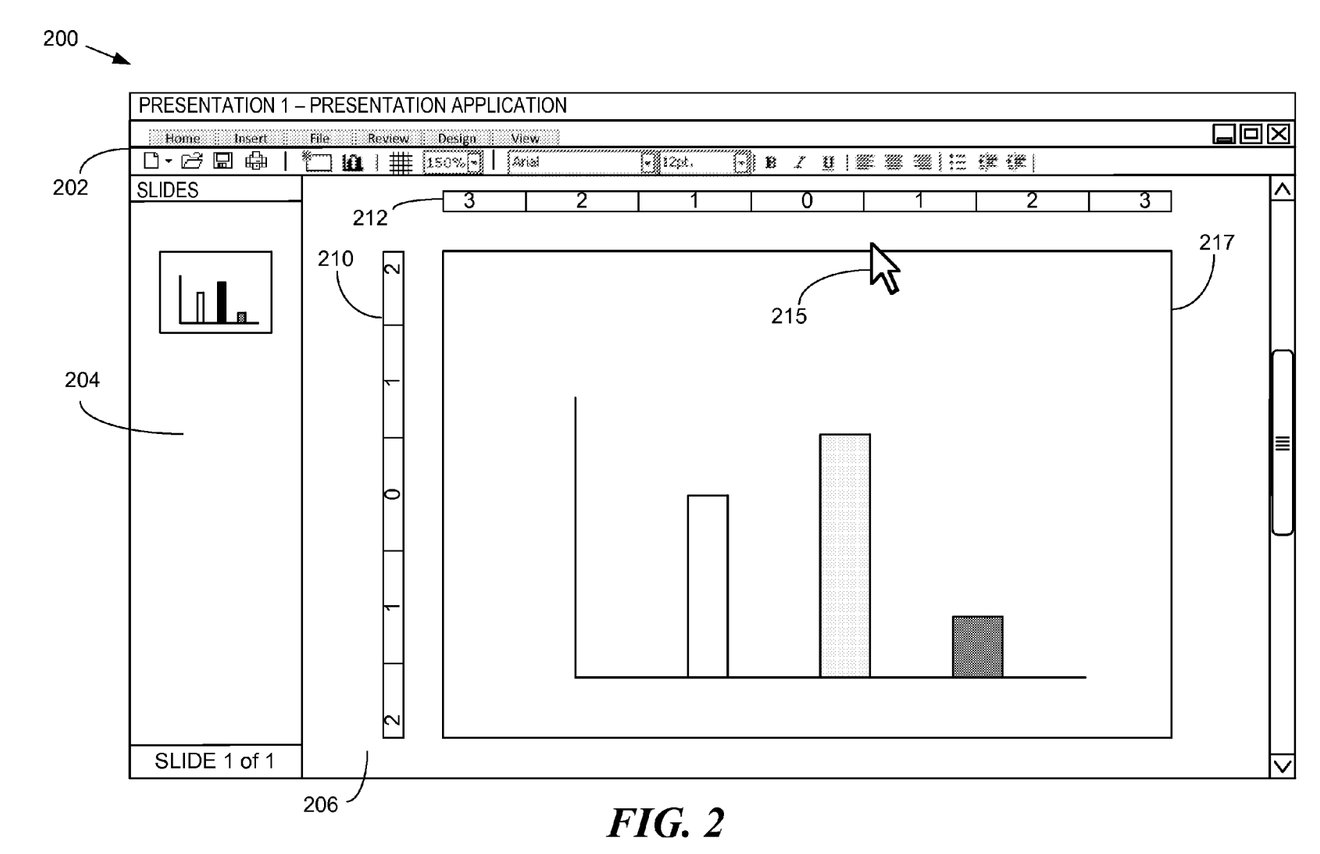
FIG. 2 is a depiction of a user interface of an authoring program prior to the user configuring the guides.

An embodiment of the UI presented by the drawing application is illustrated in FIG. 2. The UI 200 may comprise several components, such as menu/function bars 202, a navigation pane 204, and a workspace 206. The menu/function bars 202 can be presented in various forms, using, e.g., a menu ribbon, icons, drop down menus, tabs, etc. The navigation pane 204 may be present to provide a high level view of the pages in the document being authored. The cursor 215 is controlled using a pointing device, which can be based on the user using a mouse, touchpad, stub-type pointer, or other form of user input device. Other forms of input devices include using a touch-screen for controlling the cursor, where a user may use a stylus or their finger to provide input on the touch-screen.

Within the workspace 206, a document page 217 may be presented to the user. The document page 217 is typically an image of a page or slide in a series of slides of the document opened by the drawing application. Further, a vertical ruler 210 and a horizontal ruler 212 are shown within the workspace 206 in this embodiment. In some embodiments, the rulers may not be displayed at all or only a single ruler may be displayed. The ruler is one form of an aid that can assist the user in positioning or drawing items on the document. However, the ruler is limited in that user estimates the placement of the object with respect to the ruler, and precise alignment using the ruler alone can be difficult.

To further aid the user in aligning objects on the workspace 206, a guide can be provided. The guide is another aid for visually aligning objects on the workspace by providing a reference line over the workspace that objects can be aligned with. The guide can be horizontally placed or vertically placed over the workspace. The guide does not comprise an object that is part of the document. Consequently, when the document is printed for example, the guide lines are not shown.

A guide line is not the same as a grid, which can also be provided over the document image. A grid is typically a set of periodically spaced horizontal and vertical lines, but which are pre-defined in their spacing. In contrast, a guide line is positioned by the user, and typically each guide line is individually created. Further, a grid line typically cannot be reconfigured as can a guide line.

In one embodiment of the concepts disclosed, the user can readily create either a horizontal or vertical guideline over the workspace and this can be done using a single ruler. Thus, either the vertical or horizontal ruler can be used to generate a vertical and/or horizontal guide line as will be seen below.

Figure 3A:
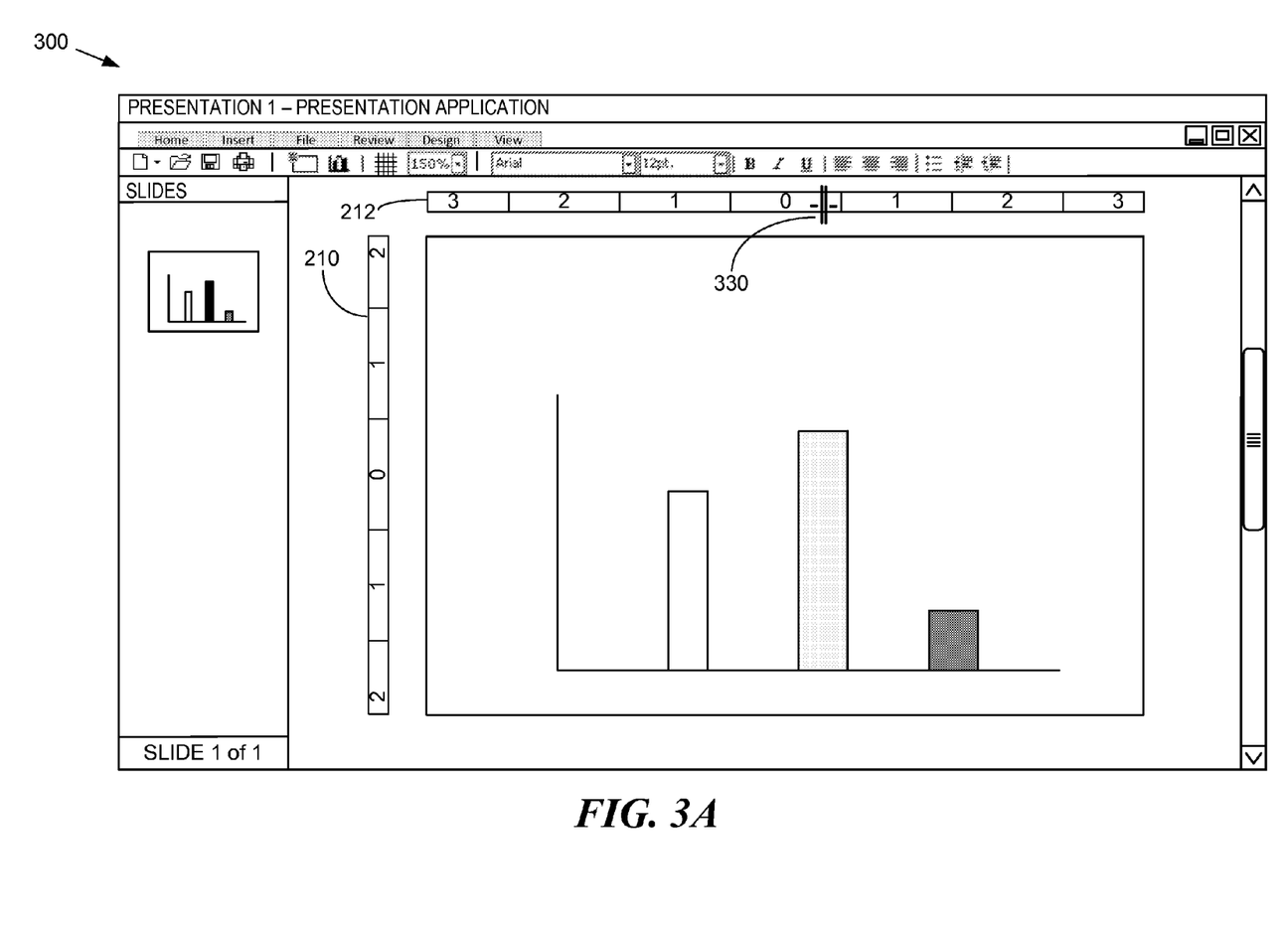
FIGS. 3A-3B are a depiction of the user interface of the authoring program where the user has configured a vertical guide using a horizontal ruler.

Creating a guide line first involves the user positioning the cursor 215 over the ruler. When this occurs, the shape of the cursor will change from an arrow-type cursor to what is referred to herein as a "hover cursor." In one embodiment, the hover cursor's shape comprises two parallel lines, as shown in FIG. 3A. In other embodiments, other shapes can be used. Turning to FIG. 3A, the hover cursor 330 changes to the aforementioned shape when positioned over ruler 212. The guide line is usually not automatically created merely by placing the cursor over the ruler 212 causing a hover cursor 330 to appear.

The user may also move the pointing device (e.g., a mouse) side-to-side to position the hover cursor left or right of its current position. If the user moves the pointing device up, thereby placing the cursor on the menu bar 202, the cursor 330 will revert to an arrow shape (not shown in FIG. 3A). If the user moves the pointing device down back onto the document, the cursor may also revert back to an arrow shape.

To create the guide line when the hover cursor is positioned over the ruler, the user clicks and a guide line will appear in that location. "Click" refers to the well-known input associated with pressing and releasing a button of a pointing device, such as a mouse. This may be accomplished by pressing a left button on the mouse. Although the concepts may be illustrated herein using a mouse as the pointing device, and wherein clicking refers to pressing a button on the mouse, the concepts herein can be used with a variety of input devices, and encompass use of a touch screen, touch pad, stylus, keyboard, voice recognition, etc. In the case of a touch screen as the pointing device (such as with a table mobile device), the click input may be indicated by a short tap of a finger or selection of a button on the tablet device. Thus, the use of the term "click" applies to whatever type of input technology is used on the computing device.

Figure 3B:
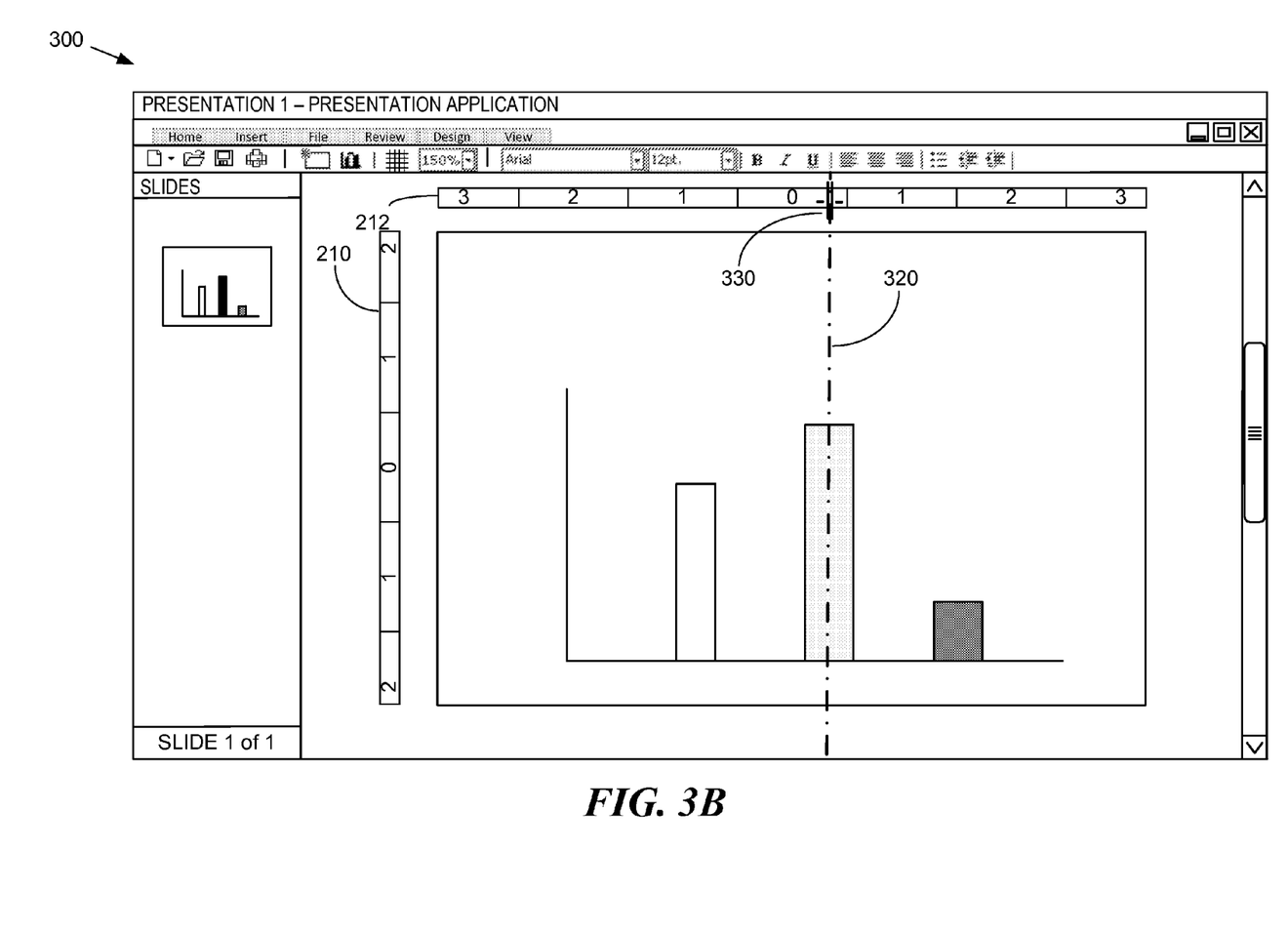

Returning to FIG. 3B, whenever the user clicks over the ruler, the guide line 320 is generated. Clicking when the hover cursor 330 is over the ruler 212 generates a vertical guideline 320 at that location.

Figure 4:
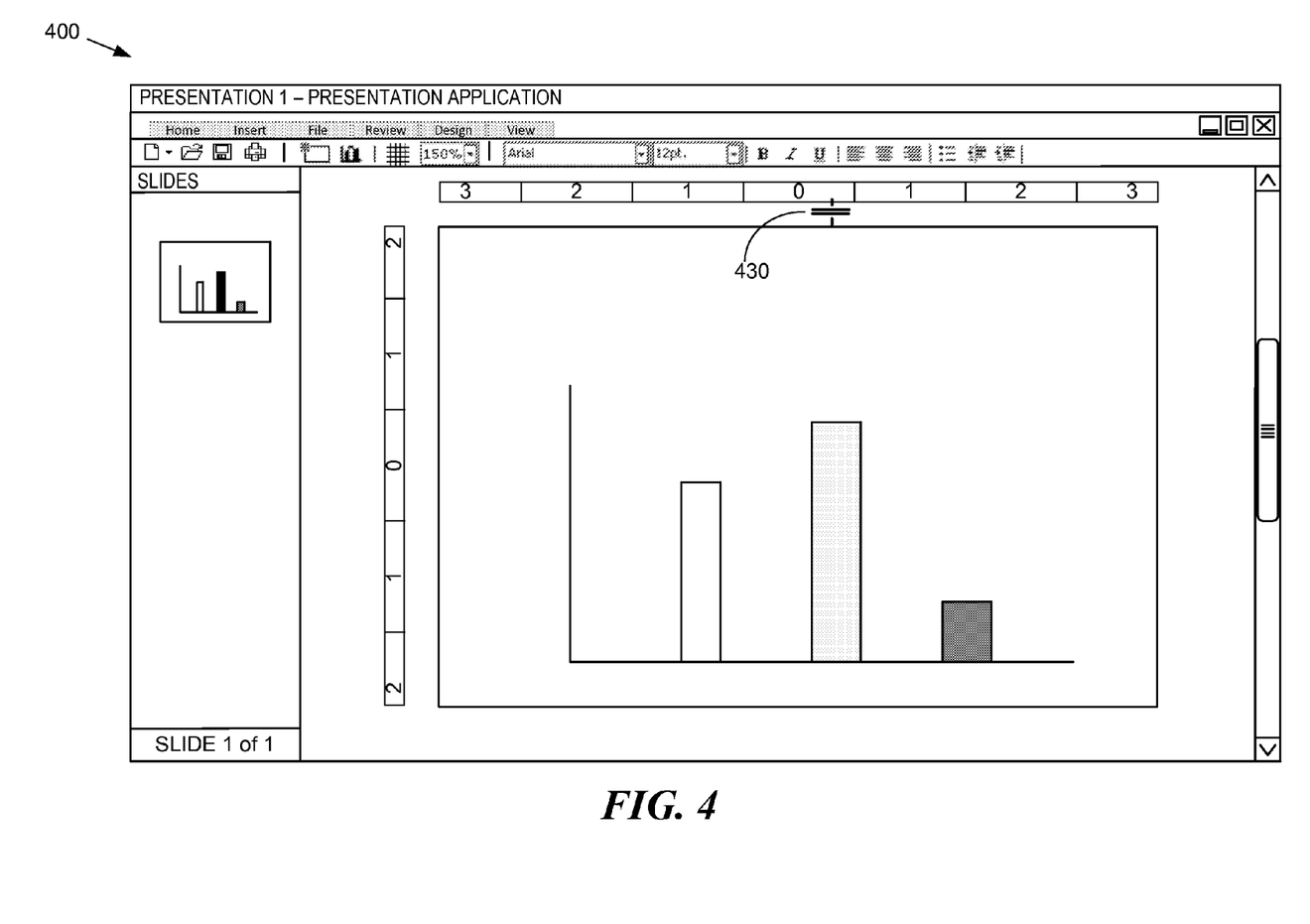
FIG. 4 is a depiction of the user interface of the authorizing program depicting a hovering cursor for generating the horizontal guide.

To create a horizontal guide line, the above procedures are slightly modified when performed by the user. The user places the cursor on, or just below, the ruler as shown in FIG. 4. As seen in FIG. 4, the hover cursor 430 still comprises two parallel lines, but is now horizontally oriented. Thus, the orientation of the hover cursor indicates to the user the type of guide line (e.g., either vertical or horizontal) that will be created. The user then presses and holds the button on the mouse (or an equivalent function for different types of pointing device). This action is termed herein as "click-and-hold." Thus, "click" refers to pressing and releasing the mouse button, whereas "click-and-hold" refers to pressing and holding the mouse button. As noted, different input devices may have different actions corresponding to click and click-and-hold.

After the user click-and-holds the button, the user may provide further input by moving or dragging the hover cursor down below the ruler, thereby creating a guide line. Specifically, once the hover cursor is moved off of the ruler, or further from the ruler than a threshold value, a horizontal guide line appears. In one embodiment, the threshold value is a distance of seven pixels below the ruler. Continuing to move the cursor at this point drags the guide line along with the cursor.

Figure 5:
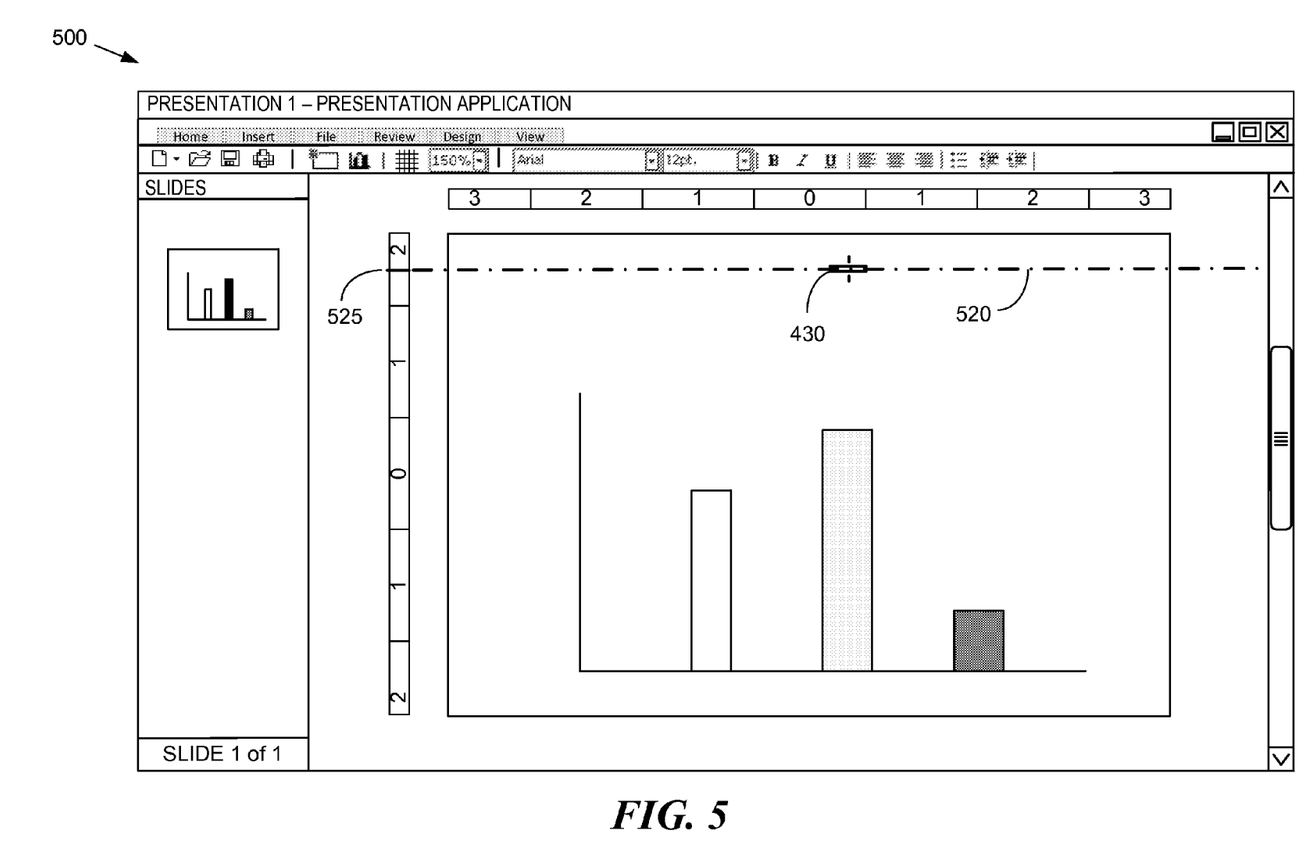
FIG. 5 is a depiction of the user interface showing the horizontal guide generated using the hovering cursor.

The horizontal guideline is illustrated in FIG. 5. Turning to FIG. 5, the hover cursor 430 is located over the document and the horizontal guide line 520 can be positioned vertically by the user sliding the hover cursor up or down. A simultaneous witness mark 525 may appear on the vertical ruler to aid the user in locating the guide line at the desired location. Once the user releases the button, the guide line is fixed at that position.

To state the operation in other words, when the cursor is placed on the ruler, it will change from a cursor having a first shape to a cursor having a second shape, where the shape comprises two parallel lines. If the user clicks on the ruler, a guide line that is orthogonal to the ruler is created. The user can then select the guide line by click-and-holding over the guide line and dragging the guide line along with the cursor to a location as desired.

However, if after the cursor changes shape over the ruler, the user instead provides an input of click-and-hold, a guide line parallel to the ruler will appear. The user can then drag the guide line over the workspace. Once the button is release, the guide line is positioned at that location.

As discussed above, the above operations can be used to generate either a vertical or horizontal guide line on the workspace by using the horizontal ruler. The same procedure can be applied to the vertical ruler to generate a vertical or horizontal guide line. Placing the cursor over the vertical ruler also results in the cursor changing to a hover cursor, and clicking within the vertical ruler will generate a horizontal guide line. Click-and-hold following by dragging the hover cursor from the ruler onto the document will create a vertical guide line.

Thus, it is not necessary to have both a vertical and horizontal ruler displayed in order to generate vertical and horizontal guide lines on a workspace. The user may desire to only display a single ruler (e.g., the horizontal ruler) in order to maximize the width of the display area dedicated to the document in the workspace. Limiting the display to a single ruler does not preclude the user from generating both types of guide lines.

In one embodiment, the existence of a ruler 212 (either vertical or horizontal) is required to configure a guide line. The display of the ruler(s) may be controlled by either an icon or menu option from the menu bar 202. If a ruler is not displayed, then the authoring program can be configured to view a ruler. Once viewed, a guide line can be generated using the process described above.

In other embodiments, the guide line can be generated even if the ruler 212 is not displayed. In this embodiment, the cursor converts to a hover cursor when positioned in the location where the ruler would have been seen, and the operation of the cursor is the same as described above, except that the user does not see the ruler.

Configuring a guide line can encompass more than just generating a guide line. Configuring a guide line may encompass moving or otherwise changing visual characteristics of an existing guide line. A guide line can be moved by placing the cursor over the guide line and waiting for a change of shape of the cursor, selecting the guide line by click-and-hold followed by moving the hover cursor side-to-side to horizontally move a vertical guide line (or sliding the cursor up and down to vertically move a horizontal guide line). Releasing the button then fixed the position of the guide line.

Figure 6:
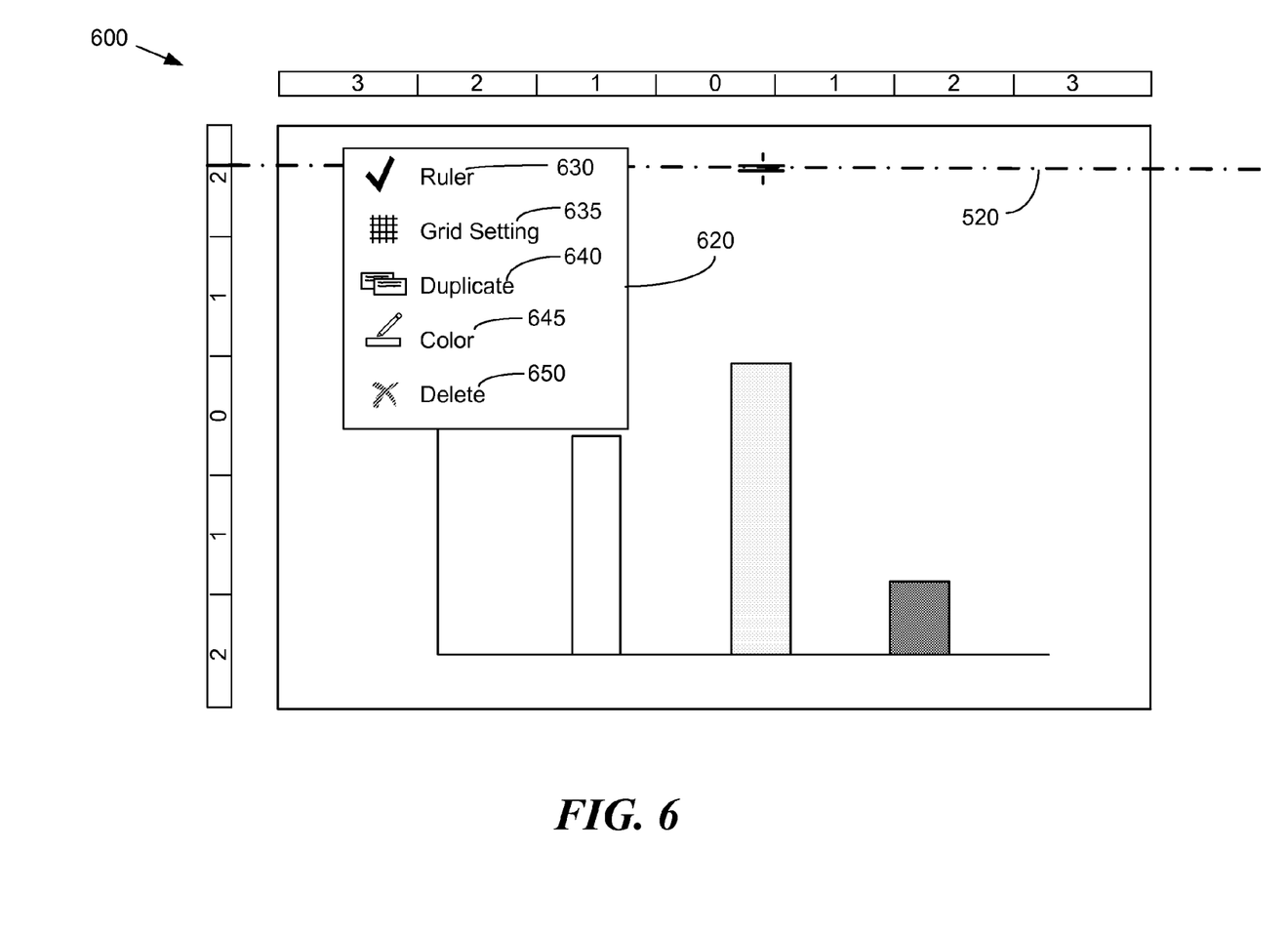
FIG. 6 illustrates a set of menu options associated with configuring an existing guide.

A guide line can be further configured by placing the cursor over a guide line 520 and right-clicking or providing other suitable input for requesting related options for the selected item. This generates a guide line modification dialog box ("dialog box") for further configuring the guide line or selecting related functions. One embodiment of a dialog box is shown in FIG. 6. In FIG. 6, the dialog box 620 presents various functions that the user can invoke with respect to the selected guide line. In general, each function is indicated by text and a corresponding icon.

The first function, ruler 630, can be used to turn OFF or ON the ruler or rulers. In one embodiment, the guide lines remain on the workspace, and the ruler must be turned back ON to add further guide lines. The ruler 630 can also be turned OFF using the aforementioned menu bar 202. Another function indicated in the dialogue box 620 is the grid setting 635. Although grid lines are distinct from guide lines, grid lines are another aid that assists the user with positioning graphic objects on the workspace. Hence, this function may be included in some embodiments within the dialogue box 620.

Another function shown in the dialogue box 620 is the duplicate function 640. This can be used to duplicate a guide line. The guide line created by invoking this function typically has the same orientation as the originally selected guide line. Thus, a horizontal guide line that is duplicated will create another horizontal guide line. This duplicated guide line is usually spaced at a pre-defined distance from the selected guide line.

The dialogue box 620 can also allow the user to alter various visual characteristics of the guide line. These visual characteristics include color, thickness, line type, or other aspects. One visual characteristic indicated is the color function 645, which when selected, can present a list of color choices that are applied to a guide line. This allows the user to select a contrasting color for easier viewing, or a color that has greater contrast.

Finally, the delete function 650 allows the selected guide line to be deleted. Another option may allow a user to delete all of the guide lines. The user may also delete a guide line by selecting the guide line and dragging it to the edge of the workspace.

Other options can be indicated in the dialog box 620, including selecting a line style for the guide line. The style could indicate a solid line, a dotted line, a dashed line, etc. Typically, the default value is a dashed line of some type. Values could be defined for various styles for each guide line or applied globally to guide lines in the document.

Figure 7A:
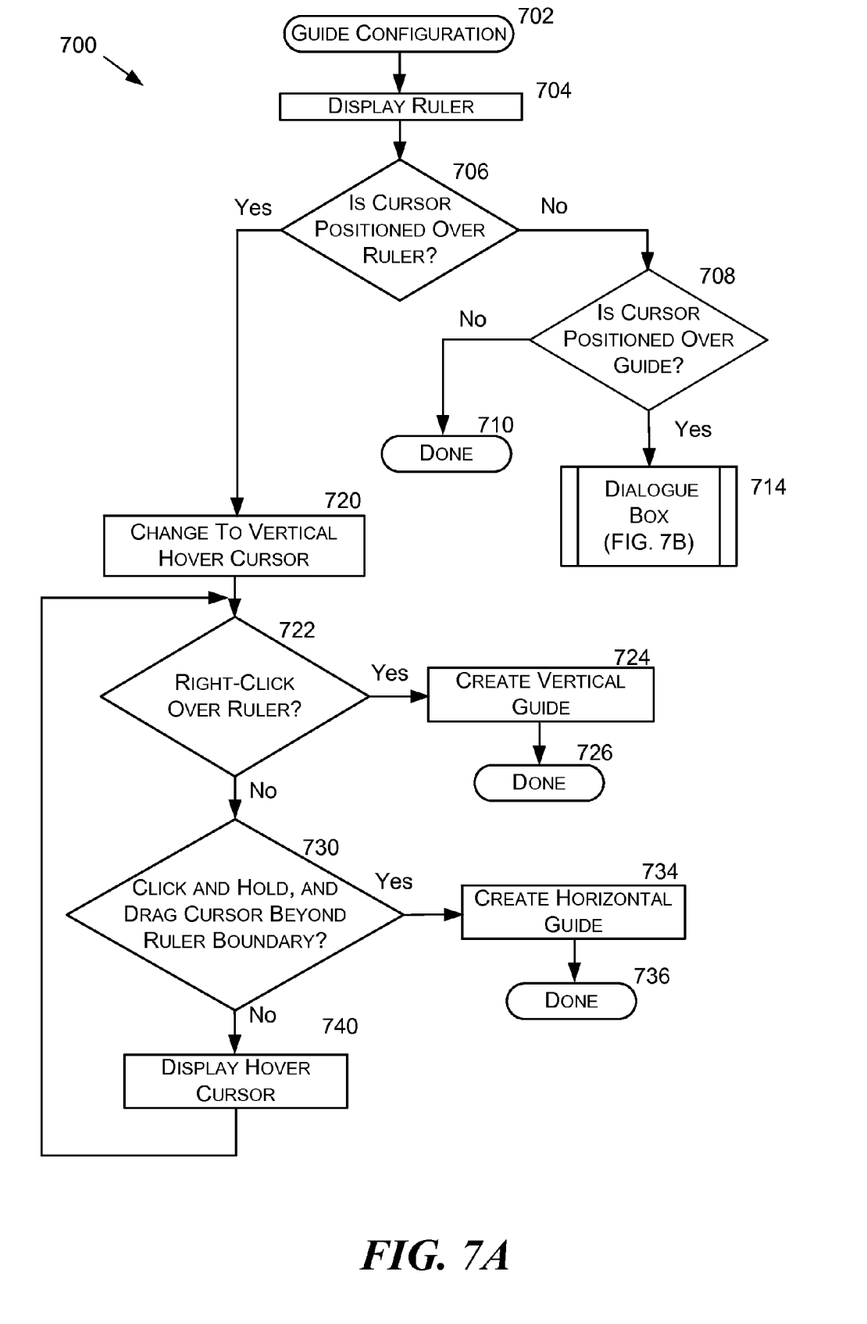
FIGS. 7A and 7B illustrate a process flow for generating the guide in the authoring program.

One embodiment of the process flow for configuring a guide is illustrated in FIG. 7A. It should be appreciated that the logical operations described herein with respect to FIG. 7A and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 7A and described herein. These operations may also be performed in a different order than those described herein.

The process flow 700 for FIG. 7A begins at 702. In FIG. 7A the process flow 700 comprises first displaying the ruler in operation 704. The ruler can be configured to automatically appear when creating a document, or the user can explicitly indicate it to be viewed. The menu bar can be used for selecting the ruler to be viewed. It is not necessary that both rulers are displayed, as either type of guide lines can be generated using either a vertical or horizontal ruler.

In operation 706, the process determines whether the cursor is positioned over the ruler. If it is, then in operation 720 the cursor is changed to a hover cursor 430 comprising two parallel lines. If the ruler is the horizontal ruler, then the parallel lines are oriented vertically.

Once the hover cursor is presented, the user can click in operation 722 over the ruler. If the user clicks, then in operation 724 the vertical guide is created in that location and the process is completed in operation 726. If the user does not click in operation 722, then the process continues to operation 730. If the user, instead, clicks-and-hold, and then drags the hover cursor beyond the ruler, then a horizontal guide is created at that location in operation 734. The process is completed in operation 736. If the user does not click-and-hold in operation 730, and drags the hover cursor (e.g., clicks-and-holds only without dragging the cursor off the ruler), then the hover cursor continues to be displayed in operation 740 and the process loops back to operation 722.

If, in operation 706, the cursor is not positioned over the ruler, then the cursor position is determined as to whether it is either positioned over the guide or not. In operation 708, if it is determined the cursor is not positioned over the guide, the process is completed in operation 710. If, instead, it is determined in operation 708 that the cursor is positioned over a guide, then the process continues in operation 714 to the process flow of the dialogue box 750 shown in FIG. 7B.

Figure 7B:
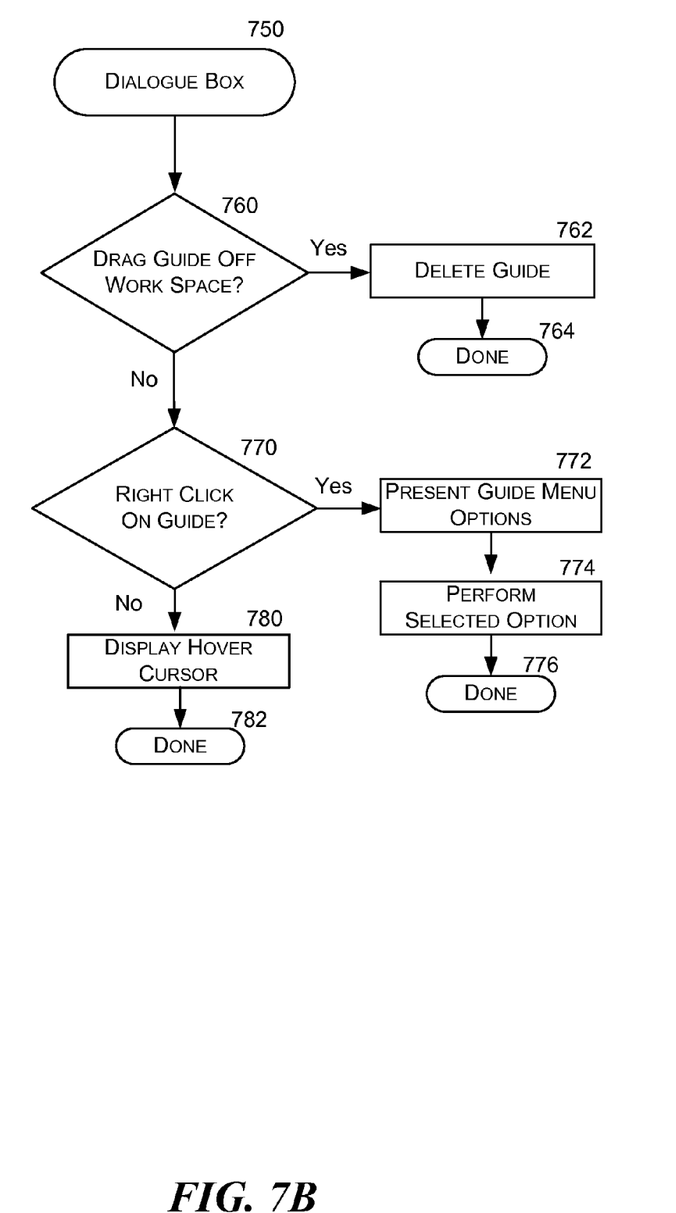

Turning to FIG. 7B, the process flow determines in operation 760 whether the user has clicked and dragged the guide off of the work space. If so, then in operation 762 the guide has been deleted and the process completes in operation 764.

If in operation 760 the user has not clicked and dragged the guide, then a determination is made whether the user has right-clicked on the guide. If so, then the menu options are presented to the user in operation 772. After selecting a function, in operation 774 the function is performed and the process completes in operation 776.

If the user has not right-clicked on the guide in operation 770, then the hover cursor is displayed as normal in operation 780, and the process completes in 782.

Figure 8:
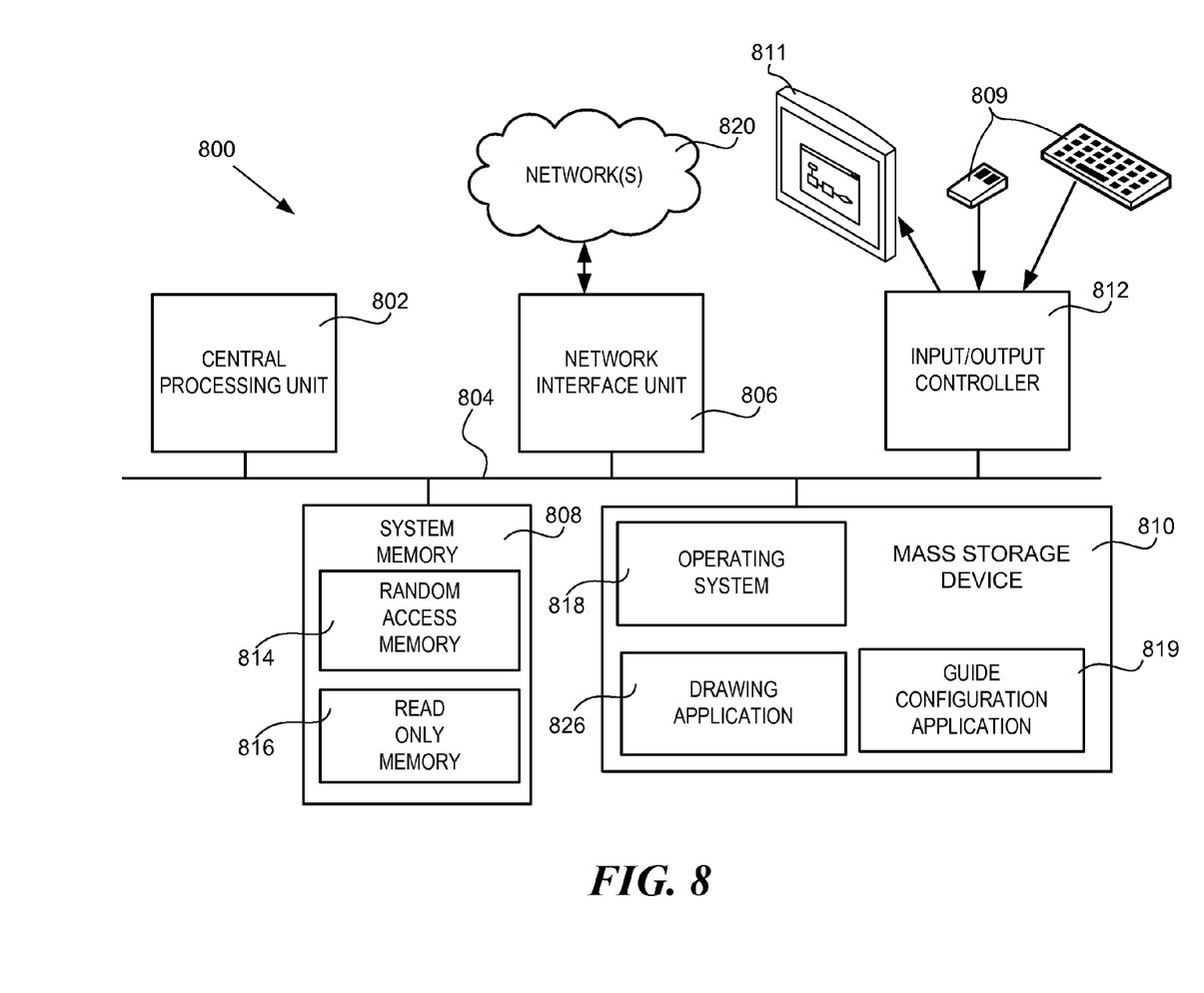
FIG. 8 illustrates a computer architecture for a computing device configured to perform the process flow for generating the guide.

The process flow described above and other related functions can be implemented in one embodiment by the computing architecture of a computing device 800 as shown in FIG. 8. FIG. 8 shows an illustrative computing architecture for a computing processing device capable of executing the processes described. Although FIG. 8 describes the computing device such as a smart phone 101, laptop computer 102, or tablet computer 105, the architecture shown in FIG. 8 may illustrate a conventional server computer, desktop computer, or other type of computer utilized to execute any aspect of the software components presented herein. Other architectures or computers may be used to execute the software components presented herein.

The computer architecture shown in FIG. 8 includes a processor 802 (a.k.a. as a centralized processing unit or "CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computing device 800, such as during startup, is stored in the ROM 816. The computing device 800 further includes a mass storage device 810 for storing an operating system 818, application programs, and other program modules, as described herein.

The mass storage device 810 is connected to the CPU 802 through a mass storage controller (not shown), which in turn is connected to the bus 804. The mass storage device 810 and its associated computer-readable media provide non-volatile storage for the computing device 800. Although the description of computer-readable media contained herein refers to a mass storage device, such as a hard disk or CD-ROM drive, it should be appreciated by those skilled in the art that computer-readable media can be any available computer storage media that can be accessed by the computing device 800.

It should be appreciated by those skilled in the art that computer-readable media may be any available media that can be accessed by the computing device 800, including computer-readable storage media and communications media. Communications media includes transitory signals. Computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processing computing device 800. Computer readable storage media does not encompass transitory signals.

According to various embodiments, the processing computing device 800 may operate in a networked environment using logical connections to remote computers or servers through a network 820. The computing device 800 may connect to the network 820 using an antenna (not shown). In other embodiments, connection to other types of network may be accomplished using an input/output controller 812. The input/output controller 812 can be used for receiving and processing input from a number of other devices 809, including a keyboard, mouse, or electronic stylus (not shown in FIG. 8). Similarly, an input/output controller 812 may provide output to a display screen 811, a printer, or other type of output device (also not shown in FIG. 8). In one embodiment, the computing device may incorporate a display screen 811 comprising a touch screen display. The touch screen display functions to not only display information, but also to receive input from the user, including inputting text, commands, and controls.

As mentioned briefly above, a number of applications or program modules and data files may be stored in the mass storage device 810 and RAM 814 of the computing device 800, including an operating system 818 suitable for controlling the operation of a networked desktop, laptop, tablet or server computer. The mass storage device 810 and RAM 814 may also store one or more program modules or data files. In particular, the mass storage device 810 and the RAM 814 may store the drawing application 826. The mass storage device 810 and RAM 814 may also store a separate guide configuration application module 819 that communicates with the drawing application 826 that performs the process flows indicated herein. This guide configuration application module 819 may be called by the drawing application as needed, or may be integrated into the drawing application.

It should be appreciated that the software components described herein may, when loaded into the CPU 802 and executed, transform the CPU 802 and the overall computing device 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 800 in order to store and execute the software components presented herein. It also should be appreciated that the computing device 800 may comprise other types of computing devices, including hand-held computers, embedded computer systems, personal digital assistants, and other types of computing devices known to those skilled in the art. It is also contemplated that the computing device 800 may not include all of the components shown in FIG. 8, may include other components that are not explicitly shown in FIG. 8, or may utilize an architecture completely different than that shown in FIG. 8.

Based on the foregoing, it should be appreciated that users can easily configure either a vertical or horizontal guide in a workspace using a single ruler when authoring a document.

It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating a guide line comprising:
   detecting by a processor a cursor positioned over a ruler on a user interface of an authoring program executing on the processor;
   altering an appearance of the cursor by the processor from a first shape to a second shape;
   receiving a first input from a user at the processor, the first input associated with a user input device;
   generating the guide line in a first orientation if the first input from the user input device is a click; and
   generating the guide line in a second orientation orthogonal to the first orientation if the first input from the user input device is a click-and-hold while moving the cursor away from the ruler.

2. The method of claim 1, further comprising:
   positioning the guide line over a workspace in a position indicated by the first input, wherein the guide line is not part of a document opened by the authoring program.

3. The method of claim 2, further comprising:
   receiving a second input from the user at the processor, the second input associated with the user input device, and wherein
   the second shape of the cursor comprises two parallel lines,
   the first input comprises a click-and-hold input, and
   the second input comprises a dragging input for positioning the guide line over the workspace.

4. The method of claim 3, wherein the ruler and the guide line have a horizontal orientation.

5. The method of claim 3, further comprising:
   positioning the cursor having the first shape over the ruler;
   altering the first shape of the cursor to the second shape of the cursor;
   receiving a third input from the user at the processor, the third input comprising a click; and
   displaying a second guide line over the workspace orthogonal to the guide line.

6. The method of claim 5 wherein the second guide line is a vertically oriented guide line.

7. The method of claim 3, further comprising:
selecting the guide line;
selecting a function for modifying a visual characteristic of the guide line; and
modifying the visual characteristic of the guide line in response to input from the user.

8. The method of claim 3, further comprising:
selecting the guide line; and
dragging the guide line to a side of the workspace, wherein the guide line is no longer presented to the user.

9. The method of claim 3, wherein the ruler is horizontally oriented, the first input is a click, and the guide line is vertically oriented.

10. The method of claim 8, wherein the second input is a dragging input moving a position of the guide line.

11. A system for displaying a guide line comprising:
a processor configured to
detect a cursor positioned over a ruler displayed on a user interface of an authoring program,
alter an appearance of the cursor from a first shape to a second shape in response to detecting the cursor positioned over the ruler,
receive a first input from the user at the processor, the first input associated with a user input device,
generate the guide line in a first orientation if the first input is a click, and
generate the guide line in a second orientation orthogonal to the first orientation if the first input is a click-and-hold followed by input moving the cursor away from the ruler.

12. The system of claim 11, wherein the processor is further configured to:
display the guide line in a vertical manner when the ruler is horizontally oriented and the first input is the click; and
display the guide line in a horizontal manner when the ruler is vertically oriented and the first input is the click.

13. The system of claim 11, wherein the processor is further configured to:
display the guide line in a horizontal manner when the ruler is horizontally oriented and the first input is the click-and-hold follow by input moving the cursor away from the ruler.

14. The system of claim 13, wherein the processor is further configured to display the guide line when the cursor extends beyond a threshold value away from the ruler.

15. The system of claim 11, further comprising:
a display controlled by the processor for displaying the guide line on the user interface.

16. The system of claim 12, wherein the processor is further configured to:
receive the first input from the user, the input associated with the user input device,
receive a second input selecting the guide line, and
display a dialog box for changing a visual characteristic of the guide line.

17. A computer readable storage media comprising instructions that when executed cause a computer to:
detect a cursor positioned over a ruler on a user interface of an authoring program, the authoring program configured to edit a document in a workspace of the authoring program;
alter an appearance of the cursor from a first shape to a second shape in response to detecting the cursor positioned over the ruler;
receive a first input from a user;
generate the guide line in a first orientation orthogonal to the ruler if the first input is a click; and
generate the guide line in a second orientation parallel to the ruler if the first input is a click-and-hold that moves the cursor away from the ruler.

18. The computer readable storage media of claim 17, wherein the instructions when executed further cause the computer to:
receive a second input from the user and
position the guide line over the workspace of the authoring program in response to receiving the second input, wherein the guide line is not part of the document authored opened by the authoring program.

19. The computer readable storage media of claim 18, further comprising a third input for displaying a dialog box for changing a visual characteristic of the guide line.

20. The computer readable storage media of claim 17, wherein the ruler is horizontally oriented, the first orientation is vertical, and the second orientation is horizontal.

* * * * *